US012708852B2

(12) United States Patent
Law et al.

(10) Patent No.: US 12,708,852 B2
(45) Date of Patent: Aug. 18, 2026

(54) CONTENT ITEM FOR DISPLAY IN LOCATION-BASED GAME

(71) Applicant: Niantic, Inc., San Francisco, CA (US)

(72) Inventors: Herbert Law, San Jose, CA (US); Michael Chang, Belmont, CA (US)

(73) Assignee: Niantic, Inc., San Francisco, CA (US)

( * ) Notice: Subject to any disclaimer, the term of this patent is extended or adjusted under 35 U.S.C. 154(b) by 68 days.

(21) Appl. No.: 17/987,621

(22) Filed: Nov. 15, 2022

(65) Prior Publication Data

US 2024/0075391 A1 Mar. 7, 2024

Related U.S. Application Data

(60) Provisional application No. 63/404,120, filed on Sep. 6, 2022.

(51) Int. Cl.
*A63F 13/65* (2014.01)
*A63F 13/216* (2014.01)

(52) U.S. Cl.
CPC ............ *A63F 13/65* (2014.09); *A63F 13/216* (2014.09); *A63F 2300/205* (2013.01); *A63F 2300/69* (2013.01)

(58) Field of Classification Search
None
See application file for complete search history.

(56) References Cited

U.S. PATENT DOCUMENTS 8,585,476 B2 * 11/2013 Mullen .................. A63F 13/00 463/31
8,670,183 B2 3/2014 Clavin et al.
8,688,517 B2 4/2014 Lutnick et al.
8,814,691 B2 8/2014 Haddick et al.
8,968,099 B1 * 3/2015 Hanke .................. A63F 13/216 463/9
9,129,157 B2 9/2015 Chao et al.
9,539,498 B1 * 1/2017 Hanke .................... A63F 13/00
9,573,064 B2 * 2/2017 Kinnebrew .......... A63F 13/216
9,782,668 B1 * 10/2017 Golden .................. A63F 13/00
10,373,431 B2 8/2019 Levi et al.
10,486,059 B1 * 11/2019 Golden ................ A63F 13/216
10,740,804 B2 8/2020 Spivack et al.
10,857,456 B2 * 12/2020 Boudville .............. A63F 13/31
11,007,429 B2 * 5/2021 Franceus .............. A63F 13/211
(Continued)

FOREIGN PATENT DOCUMENTS

WO WO 2011/106798 A1 9/2011

OTHER PUBLICATIONS

PCT International Search Report and Written Opinion, PCT Application No. PCT/IB2023/058789, Dec. 1, 2023, 9 pages.

*Primary Examiner* — Seng H Lim
(74) *Attorney, Agent, or Firm* — Fenwick & West LLP

(57) ABSTRACT

A location-based game helps players interact with their environment without interrupting the game. For example, while a player is playing the location-based game on a client device, the client device displays a virtual content item adjacent to a location (or building) associated with the content item. The content item may provide information about the location. The content item may be displayed without obscuring virtual objects of the game, thus allowing the player to continue playing the game and simultaneously learn about and interact with their environment.

18 Claims, 10 Drawing Sheets

(56) References Cited

U.S. PATENT DOCUMENTS 11,167,205 B2 * 11/2021 Golden ................ A63F 13/332
11,229,846 B2 * 1/2022 Nomura ................ A63F 13/65
11,325,043 B2 * 5/2022 Pollock ................ A63F 13/655
11,361,519 B1 * 6/2022 Kanno ................ G06T 19/006
11,969,655 B2 * 4/2024 Pollock ................ A63F 13/655
2011/0319148 A1 * 12/2011 Kinnebrew ........... G06V 20/42 463/43
2013/0170697 A1 * 7/2013 Zises ................ G06T 3/40 382/103
2013/0178257 A1 * 7/2013 Langseth ............... A63F 13/23 345/419
2013/0293530 A1 11/2013 Perez et al.
2015/0006617 A1 * 1/2015 Yoo ................ H04M 1/72403 709/203
2016/0099876 A1 * 4/2016 Oezdemir ......... H04W 28/0215 709/202
2016/0330589 A1 * 11/2016 Tuukkanen ........... G06F 3/0482
2018/0089927 A1 * 3/2018 Anderson ........... G07F 17/3218
2018/0311573 A1 * 11/2018 Pickover ................ G16H 15/00
2018/0345129 A1 * 12/2018 Rathod ................ H04W 4/029
2018/0350144 A1 * 12/2018 Rathod .............. G06Q 20/3224
2018/0356243 A1 * 12/2018 Mehta ................ G01C 21/362
2018/0361248 A1 * 12/2018 Nomura ................ A63F 13/847
2020/0054939 A1 * 2/2020 Golden ................ A63F 13/332
2020/0061470 A1 2/2020 Kidera
2020/0101372 A1 4/2020 Drake et al.
2020/0139228 A1 * 5/2020 Nakamura ............ A63F 13/216
2020/0160055 A1 * 5/2020 Nakamura ............. G09B 29/10
2020/0206629 A1 7/2020 Bridge et al.
2020/0298126 A1 * 9/2020 Kornmann .......... G07F 17/3286
2020/0330874 A1 * 10/2020 Nomura ................ A63F 13/65
2020/0384351 A1 * 12/2020 Asano ................ G06F 3/0481
2021/0023452 A1 1/2021 Zhang
2021/0052975 A1 2/2021 Shiba et al.
2021/0095986 A1 * 4/2021 Brown ................ H04W 4/12
2022/0305388 A1 * 9/2022 Hanke ................ A63F 13/69
2023/0277934 A1 * 9/2023 Benfold ................ A63F 13/211 463/31
2024/0075391 A1 * 3/2024 Law ................ A63F 13/92
2024/0251129 A1 * 7/2024 Sharifi ............... H04N 21/4524

* cited by examiner

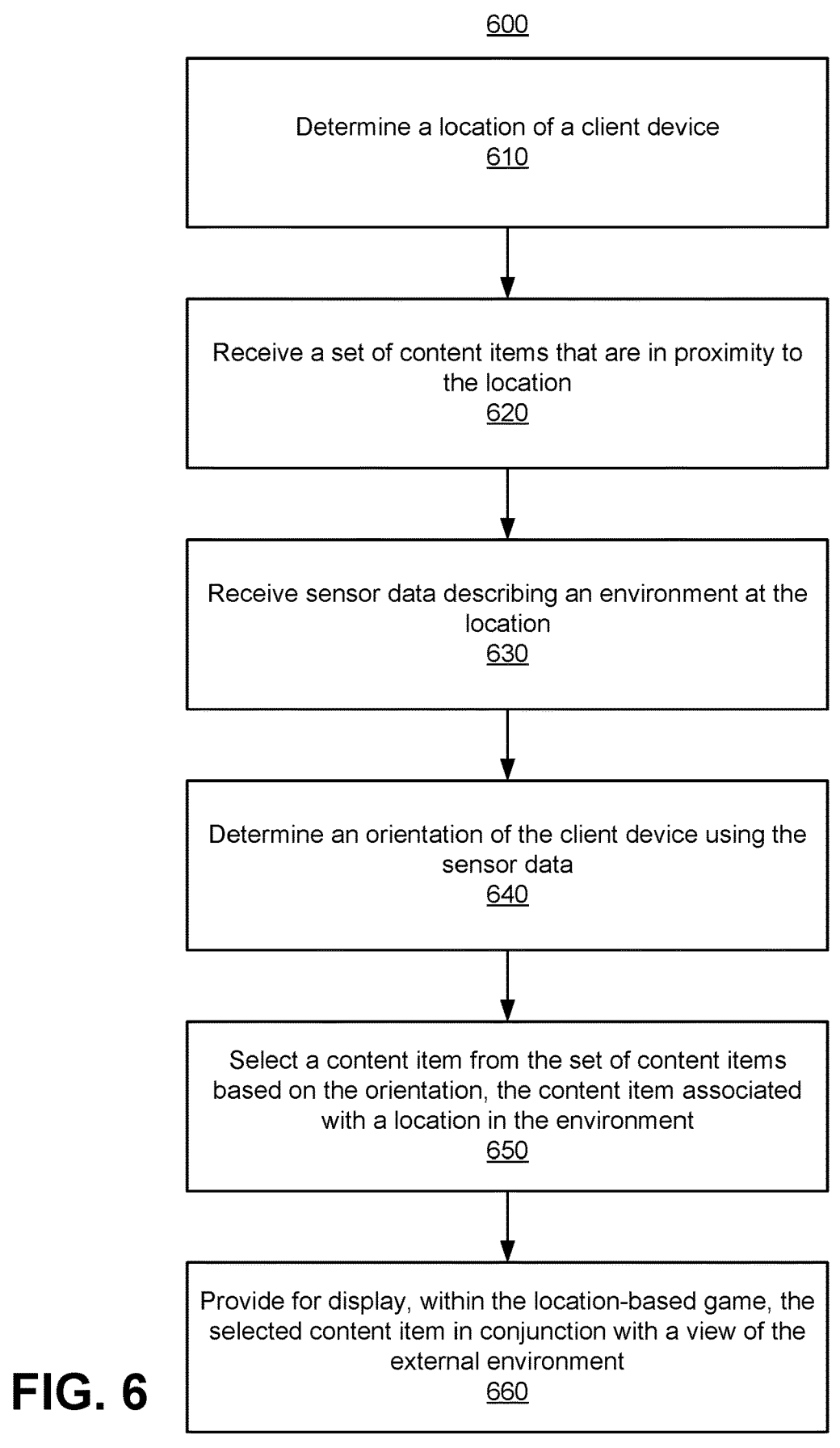

600

Determine a location of a client device
610

Receive a set of content items that are in proximity to the location
620

Receive sensor data describing an environment at the location
630

Determine an orientation of the client device using the sensor data
640

Select a content item from the set of content items based on the orientation, the content item associated with a location in the environment
650

Provide for display, within the location-based game, the selected content item in conjunction with a view of the external environment
660

FIG. 6

CONTENT ITEM FOR DISPLAY IN LOCATION-BASED GAME

CROSS-REFERENCE TO RELATED APPLICATION

This application claims priority to U.S. Provisional Patent Application No. 63/404,120, "Content Item for Display in Location-Based Game," filed on Sep. 6, 2022, which is incorporated herein by reference in its entirety.

BACKGROUND

1. Technical Field

The subject matter described relates generally to displaying virtual objects in a location-based game, and, in particular, to displaying virtual content items in a view of an environment relative to locations associated with the content items.

2. Problem

While playing a location-based game, a player may be so immersed in or focused on the game that they do not consider their surroundings. This may result in the player not interacting with their surroundings.

SUMMARY

The present disclosure relates to a location-based game that helps players interact with their environment without interrupting the game. For example, while a player is playing the location-based game on a client device, the client device displays a virtual content item adjacent to a location (or building) associated with the content item. The content item may provide information about the location. The content item may be displayed without obscuring virtual objects of the game, thus allowing the player to continue playing the game and simultaneously learn about and interact with their environment.

In some embodiments, a client device determines its location in an environment. The location may be sent to a server of the location-based game. The client device receives a set of content items (e.g., from the server) that are in proximity to the location of the client device. The client device receives, from a sensor, sensor data (e.g., an image) describing an environment at the location of the client device. The client device determines its orientation using the sensor data. The client device selects a content item from the set of content items based on the orientation. The content item is associated with a location in the environment (e.g., different from the location of the client device). The client device provides for display, within a location-based game, the selected content item in conjunction with a view of the environment.

BRIEF DESCRIPTION OF THE DRAWINGS

FIG. 6 is a flowchart of a process for displaying a virtual content item in a location-based game, according to one embodiment.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world. The subject matter described is applicable in other situations where displaying a content item is desirable. In addition, the inherent flexibility of computer-based systems allows for a great variety of possible configurations, combinations, and divisions of tasks and functionality between and among the components of the system.

Example Location-Based Parallel Reality Game

Figure 1:
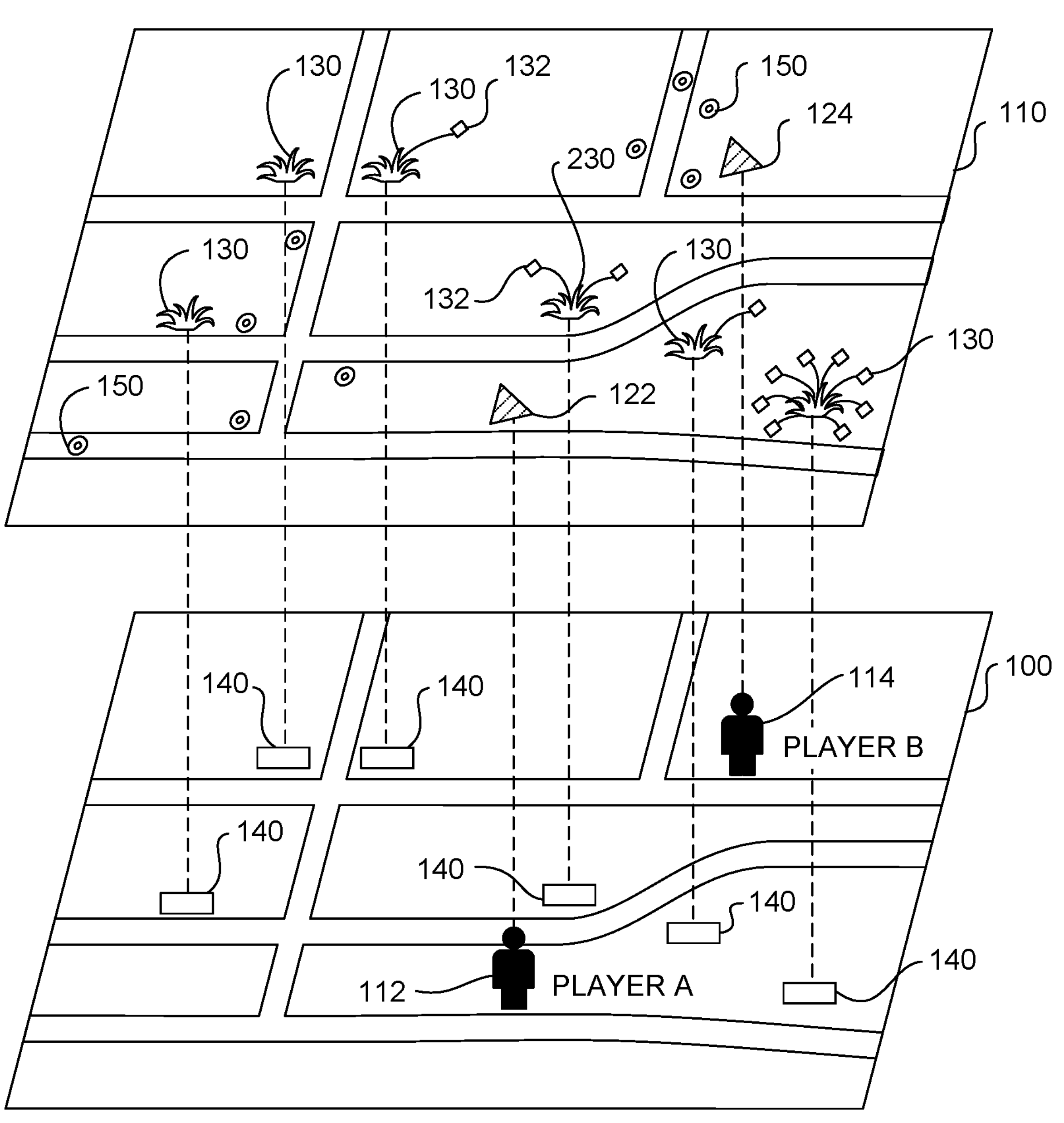
FIG. 1 depicts a representation of a virtual world having a geography that parallels the real world, according to one embodiment.

FIG. 1 is a conceptual diagram of a virtual world 110 that parallels the real world 100. The virtual world 110 can act as the game board for players of a parallel reality game. As illustrated, the virtual world 110 includes a geography that parallels the geography of the real world 100. In particular, a range of coordinates defining a geographic area or space in the real world 100 is mapped to a corresponding range of coordinates defining a virtual space in the virtual world 110. The range of coordinates in the real world 100 can be associated with a town, neighborhood, city, campus, locale, a country, continent, the entire globe, or other geographic area. Each geographic coordinate in the range of geographic coordinates is mapped to a corresponding coordinate in a virtual space in the virtual world 110.

A player's position in the virtual world 110 corresponds to the player's position in the real world 100. For instance, player A located at position 112 in the real world 100 has a corresponding position 122 in the virtual world 110. Similarly, player B located at position 114 in the real world 100 has a corresponding position 124 in the virtual world 110. As the players move about in a range of geographic coordinates in the real world 100, the players also move about in the range of coordinates defining the virtual space in the virtual world 110. In particular, a positioning system (e.g., a GPS system, a localization system, or both) associated with a mobile computing device carried by the player can be used to track a player's position as the player navigates the range of geographic coordinates in the real world 100. Data associated with the player's position in the real world 100 is used to update the player's position in the corresponding range of coordinates defining the virtual space in the virtual world 110. In this manner, players can navigate along a continuous track in the range of coordinates defining the virtual space in the virtual world 110 by simply traveling among the corresponding range of geographic coordinates in the real world 100 without having to check in or periodically update location information at specific discrete locations in the real world 100.

The location-based game can include game objectives requiring players to travel to or interact with various virtual elements or virtual objects scattered at various virtual locations in the virtual world 110. A player can travel to these virtual locations by traveling to the corresponding location of the virtual elements or objects in the real world 100. For instance, a positioning system can track the position of the player such that as the player navigates the real world 100, the player also navigates the parallel virtual world 110. The player can then interact with various virtual elements and objects at the specific location to achieve or perform one or more game objectives.

A game objective may have players interacting with virtual elements 130 located at various virtual locations in the virtual world 110. These virtual elements 130 can be linked to landmarks, geographic locations, or objects 140 in the real world 100. The real-world landmarks or objects 140 can be works of art, monuments, buildings, businesses, libraries, museums, or other suitable real-world landmarks or objects. Interactions include capturing, claiming ownership of, using some virtual item, spending some virtual currency, etc. To capture these virtual elements 130, a player travels to the landmark or geographic locations 140 linked to the virtual elements 130 in the real world and performs any necessary interactions (as defined by the game's rules) with the virtual elements 130 in the virtual world 110. For example, player A 112 may have to travel to a landmark 140 in the real world 100 to interact with or capture a virtual element 130 linked with that particular landmark 140. The interaction with the virtual element 130 can require action in the real world, such as taking a photograph or verifying, obtaining, or capturing other information about the landmark or object 140 associated with the virtual element 130.

Game objectives may require that players use one or more virtual items that are collected by the players in the location-based game. For instance, the players may travel the virtual world 110 seeking virtual items 132 (e.g., weapons, creatures, power ups, or other items) that can be useful for completing game objectives. These virtual items 132 can be found or collected by traveling to different locations in the real world 100 or by completing various actions in either the virtual world 110 or the real world 100 (such as interacting with virtual elements 130, battling non-player characters or other players, or completing quests, etc.). In the example shown in FIG. 1, a player uses virtual items 132 to capture one or more virtual elements 130. In particular, a player can deploy virtual items 132 at locations in the virtual world 110 near to or within the virtual elements 130. Deploying one or more virtual items 132 in this manner can result in the capture of the virtual element 130 for the player or for the team/faction of the player.

In one particular implementation, a player may have to gather virtual energy as part of the parallel reality game. Virtual energy 150 can be scattered at different locations in the virtual world 110. A player can collect the virtual energy 150 by traveling to (or within a threshold distance of) the location in the real world 100 that corresponds to the location of the virtual energy in the virtual world 110. The virtual energy 150 can be used to power virtual items or perform various game objectives in the game. A player that loses all virtual energy 150 may be disconnected from the game or prevented from playing for a certain amount of time or until they have collected additional virtual energy 150.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing their locations.

Figure 2:
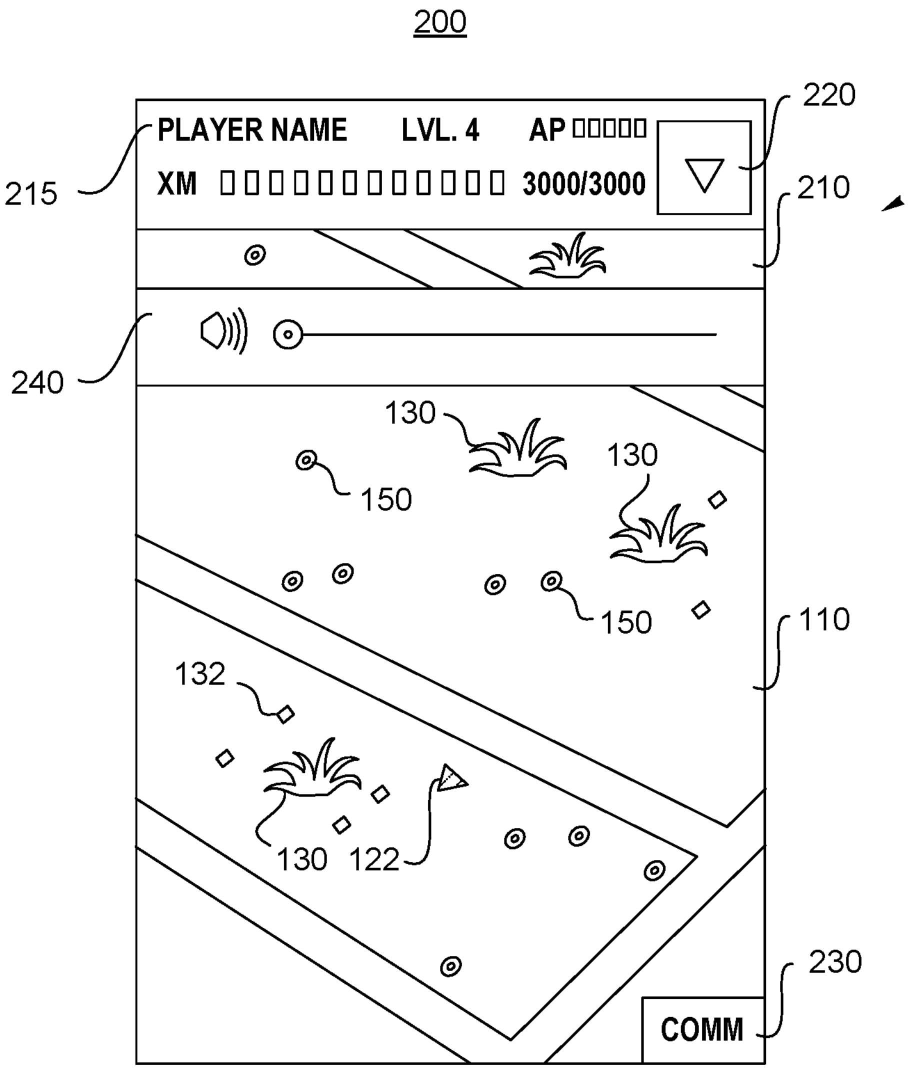
FIG. 2 depicts an exemplary game interface of a parallel reality game, according to one embodiment.

FIG. 2 depicts one embodiment of a game interface 200 that can be presented (e.g., on a player's smartphone) as part of the interface between the player and the virtual world 110. The game interface 200 includes a display window 210 that can be used to display the virtual world 110 and various other aspects of the game, such as player position 122 and the locations of virtual elements 130, virtual items 132, and virtual energy 150 in the virtual world 110. The user interface 200 can also display other information, such as game data information, game communications, player information, client location verification instructions and other information associated with the game. For example, the user interface can display player information 215, such as player name, experience level, and other information. The user interface 200 can include a menu 220 for accessing various game settings and other information associated with the game. The user interface 200 can also include a communications interface 230 that enables communications between the game system and the player and between one or more players of the parallel reality game.

According to aspects of the present disclosure, a player can interact with the parallel reality game by carrying a client device 110 around in the real world. For instance, a player can play the game by accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 200 can include non-visual elements that allow a player to interact with the game. For instance, the game interface can provide audible notifications to the player when the player is approaching a virtual element or object in the game or when an important event happens in the parallel reality game. In some embodiments, a player can control these audible notifications with audio control 240. Different types of audible notifications can be provided to the player depending on the type of virtual element or event. The audible notification can increase or decrease in frequency or volume depending on a player's proximity to a virtual element or object. Other non-visual notifications and signals can be provided to the player, such as a vibratory notification or other suitable notifications or signals.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. Players may also be able to obtain enhanced "powers" or virtual items that can be used to complete game objectives within the game.

Those of ordinary skill in the art, using the disclosures provided, will appreciate that numerous game interface configurations and underlying functionalities are possible. The present disclosure is not intended to be limited to any one particular configuration unless it is explicitly stated to the contrary.

Example Gaming System

Figure 3:
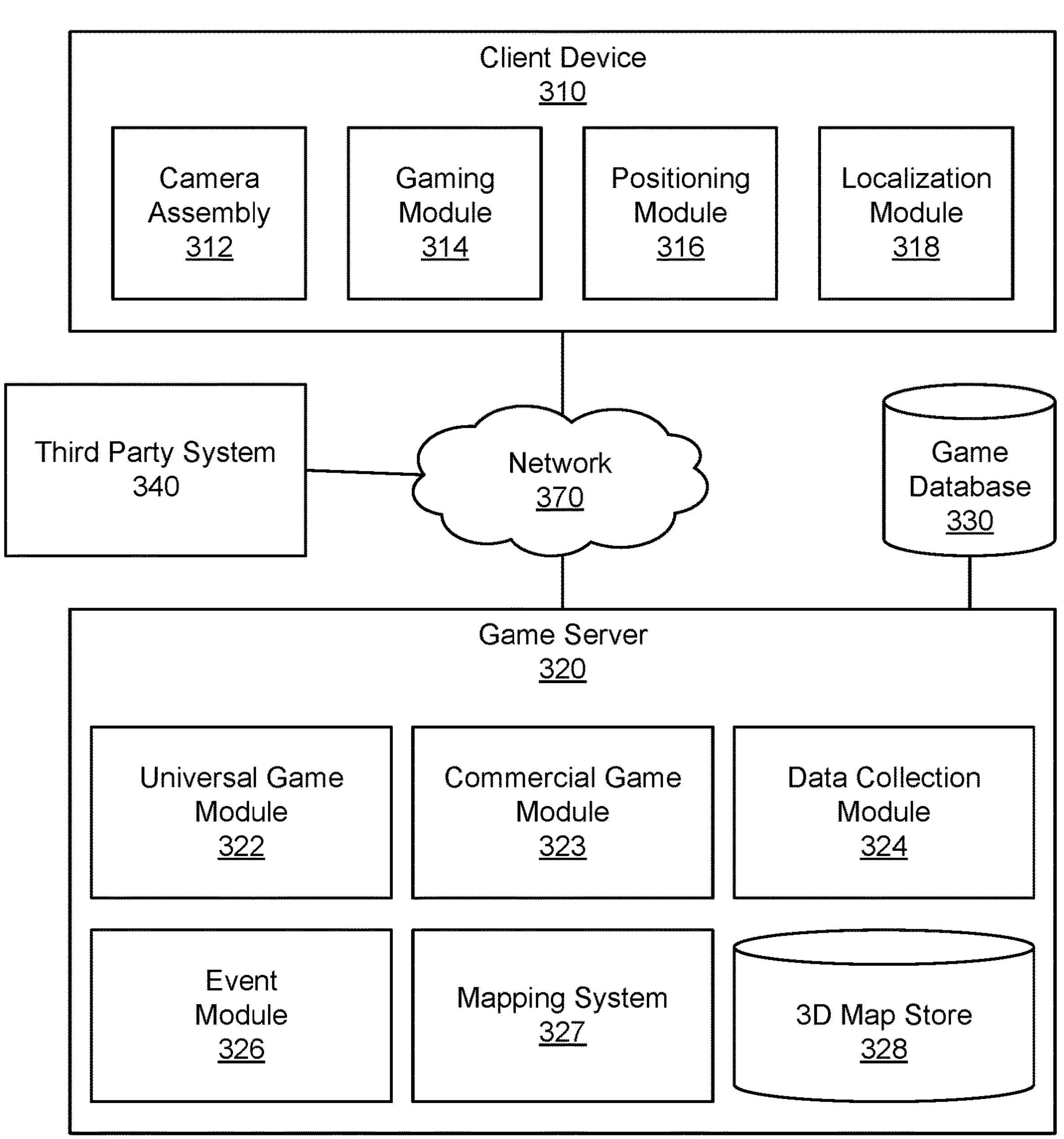
FIG. 3 is a block diagram of a networked computing environment suitable for displaying virtual content items in a location-based game, according to one embodiment.

FIG. 3 illustrates one embodiment of a networked computing environment 300. The networked computing environment 300 uses a client-server architecture, where a game server 320 communicates with a client device 310 over a network 370 to provide a parallel reality game to a player at the client device 310. The networked computing environment 300 also includes a third party system 340 which may be an external system such as a sponsor/advertiser system or business system. Although only one client device 310 is shown in FIG. 3, any number of client devices 310 or other external systems may be connected to the game server 320 over the network 370. Furthermore, the networked computing environment 300 may contain different or additional elements and functionality may be distributed between the client device 310 and the server 320 in different manners than described below.

The networked computing environment 300 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 310 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 310.

A client device 310 can be any portable computing device capable for use by a player to interface with the game server 320. For instance, a client device 310 is preferably a portable wireless device that can be carried by a player, such as a smartphone, portable gaming device, head mounted display (e.g., augmented reality (AR) or virtual reality (VR) headset), cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the game server 320 to provide sensory data of a physical environment. In one embodiment, the client device 310 includes a camera assembly 312, a gaming module 314, positioning module 316, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras which can capture image data. The cameras capture image data describing a scene of the environment surrounding the client device 110 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video.

The client device 310 may also include additional sensors for collecting data regarding the environment surrounding the client device, such as movement sensors, accelerometers, gyroscopes, barometers, thermometers, light sensors, microphones, (e.g., magnetic) compasses, etc. The image data captured by the camera assembly 312 can be appended with metadata describing other information about the image data, such as additional sensory data (e.g., temperature, brightness of environment, air pressure, location, pose etc.) or capture data (e.g., exposure length, shutter speed, focal length, capture time, etc.).

The gaming module 314 provides a player with an interface to participate in the parallel reality game. The game server 320 transmits game data over the network 370 to the client device 310 for use by the gaming module 314 to provide a local version of the game to a player at locations remote from the game server. In one embodiment, the gaming module 314 presents a user interface on a display of the client device 310 that depicts a virtual world (e.g., renders imagery of the virtual world) and allows a player to interact with the virtual world to perform various game objectives. In some embodiments, the gaming module 314 presents images of the real world (e.g., captured by the camera assembly 312) augmented with virtual elements from the parallel reality game. In these embodiments, the gaming module 314 may generate or adjust virtual content according to other information received from other components of the client device 310. For example, the gaming module 314 may adjust a virtual object to be displayed on the user interface according to a depth map of the scene captured in the image data.

The gaming module 314 can also control various other outputs to allow a player to interact with the game without requiring the player to view a display screen. For instance, the gaming module 314 can control various audio, vibratory, or other notifications that allow the player to play the game without looking at the display screen.

The positioning module 316 can be any device or circuitry for determining the position of the client device 310. For example, the positioning module 316 can determine actual or relative position by using a satellite navigation positioning system (e.g., a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

As the player moves around with the client device 310 in the real world, the positioning module 316 tracks the position of the player and provides the player position information to the gaming module 314. The gaming module 314 updates the player position in the virtual world associated with the game based on the actual position of the player in the real world. Thus, a player can interact with the virtual world simply by carrying or transporting the client device 310 in the real world. In particular, the location of the player in the virtual world can correspond to the location of the player in the real world. The gaming module 314 can provide player position information to the game server 320 over the network 370. In response, the game server 320 may enact various techniques to verify the location of the client device 310 to prevent cheaters from spoofing their locations. It should be understood that location information associated with a player is utilized only if permission is granted after the player has been notified that location information of the player is to be accessed and how the location information is to be utilized in the context of the game (e.g., to update player position in the virtual world). In addition, any location information associated with players is stored and maintained in a manner to protect player privacy.

The localization module 318 receives the location determined for the client device 310 by the positioning module 316 and refines it by determining a pose of one or more cameras of the camera assembly 312. In one embodiment, the localization module 318 uses the location generated by the positioning module 316 to select a 3D map of the environment surrounding the client device 310. The localization module 318 may obtain the 3D map from local storage or from the game server 320. The 3D map may be a point cloud, mesh, or any other suitable 3D representation of the environment surrounding the client device 310.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dead reckoning based on sensor readings, periodic re-localization, or a combination of both. Having an accurate pose for the client device 310 may enable the game module 314 to present virtual content overlaid on images of the real world (e.g., by displaying virtual elements in conjunction with a real-time feed from the camera assembly 312 on a display) or the real world itself (e.g., by displaying virtual elements on a transparent display of an AR headset) in a manner that gives the impression that the virtual objects are interacting with the real world. For example, a virtual character may hide behind a real tree, a virtual hat may be placed on a real statue, or a virtual creature may run and hide if a real person approaches it too quickly.

The game server 320 includes one or more computing devices that provide game functionality to the client device 310. The game server 320 can include or be in communication with a game database 330. The game database 330 stores game data used in the parallel reality game to be served or provided to the client device 320 over the network 370.

The game data stored in the game database 330 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); or (8) any other data used, related to, or obtained during implementation of the parallel reality game. The game data stored in the game database 330 can be populated either offline or in real time by system administrators or by data received from players (e.g., players) of the system 300, such as from a client device 310 over the network 370.

In one embodiment, the game server 320 is configured to receive requests for game data from a client device 310 (for instance via remote procedure calls (RPCs)) and to respond to those requests via the network 370. The game server 320 can encode game data in one or more data files and provide the data files to the client device 310. In addition, the game server 320 can be configured to receive game data (e.g., player positions, player actions, player input, etc.) from a client device 310 via the network 370. The client device 310 can be configured to periodically send player input and other updates to the game server 320, which the game server uses to update game data in the game database 330 to reflect any and all changed conditions for the game.

In the embodiment shown in FIG. 3, the game server 320 includes a universal gaming module 322, a commercial game module 323, a data collection module 324, an event module 326, a mapping system 327, and a 3D map 328. As mentioned above, the game server 320 interacts with a game database 330 that may be part of the game server or accessed remotely (e.g., the game database 330 may be a distributed database accessed via the network 370). In other embodiments, the game server 320 contains different or additional elements. In addition, the functions may be distributed among the elements in a different manner than described.

The universal game module 322 hosts an instance of the parallel reality game for a set of players (e.g., all players of the parallel reality game) and acts as the authoritative source for the current status of the parallel reality game for the set of players. As the host, the universal game module 322 generates game content for presentation to players (e.g., via their respective client devices 310). The universal game module 322 may access the game database 330 to retrieve or store game data when hosting the parallel reality game. The universal game module 322 may also receive game data from client devices 310 (e.g., depth information, player input, player position, player actions, landmark information, etc.) and incorporates the game data received into the overall parallel reality game for the entire set of players of the parallel reality game. The universal game module 322 can also manage the delivery of game data to the client device 310 over the network 370. In some embodiments, the universal game module 322 also governs security aspects of the interaction of the client device 310 with the parallel reality game, such as securing connections between the client device and the game server 320, establishing connections between various client devices, or verifying the location of the various client devices 310 to prevent players cheating by spoofing their location.

The commercial game module 323 can be separate from or a part of the universal game module 322. The commercial game module 323 can manage the inclusion of various game features within the parallel reality game that are linked with a commercial activity in the real world. For instance, the commercial game module 323 can receive requests from third party systems 340 (e.g., sponsors/advertisers, businesses, or other entities) over the network 370 to include game features linked with commercial activity in the real world. The commercial game module 323 can then arrange for the inclusion of these game features in the parallel reality game on confirming the linked commercial activity has occurred. For example, if a business pays the provider of the parallel reality game an agreed upon amount, a virtual object identifying the business may appear in the parallel reality game at a virtual location corresponding to a real-world location of the business (e.g., a store or restaurant).

The data collection module 324 can be separate from or a part of the universal game module 322. The data collection module 324 can manage the inclusion of various game features within the parallel reality game that are linked with a data collection activity in the real world. For instance, the data collection module 324 can modify game data stored in the game database 330 to include game features linked with data collection activity in the parallel reality game. The data collection module 324 can also analyze and data collected by players pursuant to the data collection activity and provide the data for access by various platforms.

The event module 326 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The mapping system 327 generates a 3D map of a geographical region based on a set of images. The 3D map may be a point cloud, polygon mesh, or any other suitable representation of the 3D geometry of the geographical region. The 3D map may include semantic labels providing additional contextual information, such as identifying objects tables, chairs, clocks, lampposts, trees, etc.), materials (concrete, water, brick, grass, etc.), or game properties (e.g., traversable by characters, suitable for certain in-game actions, etc.). In one embodiment, the mapping system 327 stores the 3D map along with any semantic/contextual information in the 3D map store 328. The 3D map may be stored in the 3D map store 328 in conjunction with location information (e.g., GPS coordinates of the center of the 3D map, a ringfence defining the extent of the 3D map, or the like). Thus, the game server 320 can provide the 3D map to client devices 310 that provide location data indicating they are within or near the geographic area covered by the 3D map.

The network 370 can be any type of communications network, such as a local area network (e.g., intranet), wide area network (e.g., Internet), or some combination thereof. The network can also include a direct connection between a client device 310 and the game server 320. In general, communication between the game server 320 and a client device 310 can be carried via a network interface using any type of wired or wireless connection, using a variety of communication protocols (e.g., TCP/IP, HTTP, SMTP, FTP), encodings or formats (e.g., HTML, XML, JSON), or protection schemes (e.g., VPN, secure HTTP, SSL).

One or more third party systems 340 may be coupled to the network 370 for communicating with the game server 320 (e.g., the commercial game module 323) or the client device 310. In some embodiments, a third party system 340 is a system that provides content or other information for presentation in the location-based game. For example, the third party system 340 may communicate information to the game server 320, such as advertisements, content, or information, for various game features within the game that are linked with commercial activity in the real world. A third party system 340 may include a business or store at a location in the real world that provides products for purchase.

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about players (also referred to as users), or make use of personal information, such as location information, the players may be provided with an opportunity to control whether programs or features collect the information and control whether or how to receive content from the system or other application. No such information or data is collected or used until the player has been provided meaningful notice of what information is to be collected and how the information is used. The information is not collected or used unless the player provides consent, which can be revoked or modified by the player at any time. Thus, the player can have control over how information is collected about the player and used by the application or system. In addition, certain information or data can be treated in one or more ways before it is stored or used, so that personally identifiable information is removed. For example, a player's identity may be treated so that no personally identifiable information can be determined for the player.

Figure 4:
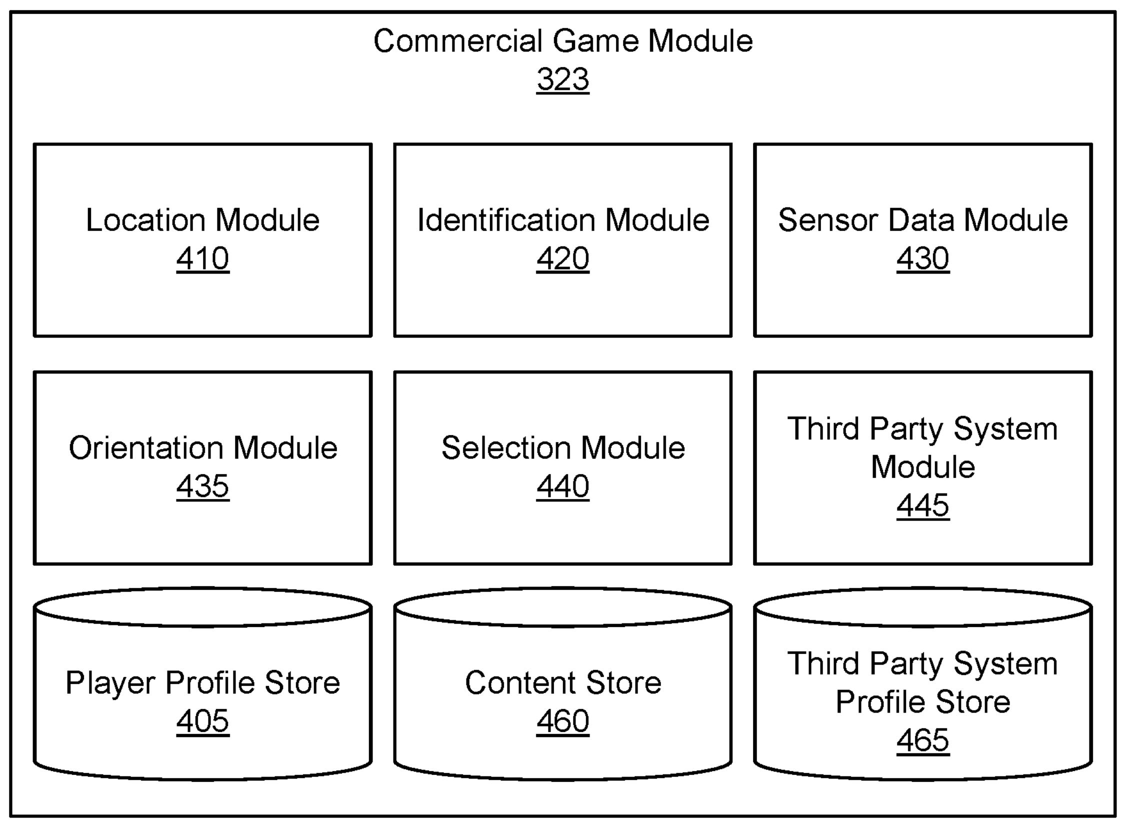
FIG. 4 is a block diagram of the commercial game module shown in FIG. 3, according to one embodiment.

FIG. 4 is a block diagram of an architecture of the commercial game module 323. The commercial game module 323 shown in FIG. 4 includes a player profile store 405, a location module 410, an identification module 420, a sensor data module 430, an orientation module 435, a selection module 440, a third party system module 445, a content store 460, and a third party system profile store 465. In other embodiments, the commercial game module 323 may include additional, fewer, or different components for various applications. Although modules 410, 420, 430, 435, 440, and 445 and stores 405, 460, and 465 are illustrated and described as part of the commercial game module 323 on the game server 320, any of these modules or stores may be part of the client device 310.

Each player may be associated with a player profile, which is stored in the player profile store 405. A player profile includes information about the player that was explicitly shared by the player and may also include profile information inferred (e.g., by the commercial game module 323). In one embodiment, a player profile includes multiple data fields, each describing one or more attributes of the corresponding online system player. Examples of information stored in a player profile include biographic, demographic, and other types of descriptive information, such as work experience, educational history, gender, hobbies or preferences, location, and the like.

The location module 410 may receive a location of the client device 310 in the real world. For example, the positioning module 316 or the localization module 318 determine the location of the client device 310. Afterward, the client device 310 transmits the determined location to the location module 410 (e.g., via network 370). In some embodiments, the location module 410 receives sensor data from the client device 310 and determines the location of the client device 310 (e.g., using similar methods described with respect to modules 316 or 318). In embodiments where the location modules 410 is on the client device 310, the location module 410 may be part of the positioning module 316 or the localization module 318.

The identification module 420 receives the location of the client device 310 from the location module 410 and identifies a set of content items that are in proximity to the location. For example, the identification module 420 identifies content items in the content store 460 that are associated with locations that are within a threshold distance of the location of the client device 310. The content items in the set are candidate content items that may be selected by the selection module 440 to be displayed by the client device 310. The identified set of content items may be associated with bids (e.g., each identified content item is associated with a different bid).

In some embodiments, the identification module 420 selects content items with products that are currently available for purchase or will be available for purchase for a threshold amount of time (e.g., available for at least the next hour). In some embodiments, the identification module 420 does not select content items with products that are not currently available for purchase (e.g., due to the store being closed) or not available for the threshold amount of time (e.g., the store is closing in less than an hour). For example, a content item related to snowboard rentals is not selected during the summer.

Additionally, or alternatively, the identification module 420 selects content items based on interests of the player of the client device 310. For example, the identification module 420 uses a player profile of the player to identify content items with products the player may be interested in purchasing (e.g., products with the highest estimated conversion rates). The identification module 420 may consider data in a player profile, such as player purchase history, locations visited history, age group, gender, race, seasonal interests, social interests (e.g., indicating how active the player is for social enabled activities/games), and other demographics. For example, if the player profile indicates that a player previously purchased tea, the identification module 420 may identify one or more content items advertising tea (or related products) associated with locations that are within a threshold distance of the location of the client device 310. In another example, if the player profile indicates a player likes skiing in the winter and mountain biking in the summer, the identification module 420 may identify a content item related to skiing or mountain biking depending on the current season. As suggested in the previous example, non-player data may also be considered when identifying a content item. Examples of non-player data include the current season, time of day, weather within a threshold distance of the player, events within a threshold distance of the player, or traffic within a threshold distance of the player. Player profile data or non-player data may be used in conjunction with targeting criteria (targeting criteria is further described below with respect to the third party system module 445). In some embodiments, the identification module 420 includes a trained artificial intelligence algorithm that accounts for information in a player profile or targeting criteria.

The sensor data module 430 receives, from a sensor of the client device 310, sensor data describing an environment at the location of the client device 310. As described above, the client device 310 can include a variety of sensors for collecting data related to the environment (e.g., camera assembly 312, movement sensors, accelerometers, or gyroscopes). The sensor data module 430 may receive sensor data from any of these sensors. The sensor data will be used by the orientation module 435 to determine an orientation of the client device 310 in the environment. Thus, the sensor data module 430 may select to receive data from one or more specific sensors and may receive sufficient amounts of data from those sensors so that the orientation module 435 can determine the orientation of the client device 310 to within a predetermined orientation error threshold.

The orientation module 435 receives the sensor data from the sensor data module 430 and determines an orientation of the client device 310 based on the sensor data. Depending on the embodiment, the orientation may refer to the orientation of the client device 310 relative to the environment (e.g., the ground) or the orientation of the client device 310 relative to locations associated with content items (e.g., content items in the set identified by module 420). In some cases, the orientation of the client device 310 refers to the pose of the client device 310. In some embodiments, the sensor data module 430 and the orientation module 435 are part of the localization module 318 on the client device 310 or the localization module 318 performs the functions of the sensor data module 430 and the orientation module 435.

The selection module 440 receives the orientation of the client device 310 and selects a content item from the set of content items (identified by the identification module 420) based on the orientation. For example, the selection module 440 may select the content item that is the best match for the player (e.g., indicated by an affinity score) that is within the current field of view of a camera of the player's client device 310. The selected content item is transmitted to the client device 310 to be displayed in a game interface (e.g., see description with respect to FIGS. 5A-5C). For example, the client device 310 is instructed to display the content item in conjunction with a view of an environment (e.g., of the real world or the virtual world). In embodiments where the selection module 440 is on the client device 310, the set of content items identified by the identification module 420 may be transmitted to selection module 440 via the network 370. The selection module 440 on the client device 310 may then provide the content item for display by the client device 310 (e.g., transmit the selected content item to a display module of the client device 310 for display).

Generally, the selection module 440 selects a content item from the set that is associated with a location that is (or will be) within a field of view of a sensor of the client device 310 or within a field of view displayed by the client device 310. For example, the selection module 440 selects a content item associated with a location that is in a view of an environment, where the view of the environment is displayed by the client device 310 in an interface of the location-based game. However, this is not the case in some embodiments. For example, the selection module 440 selects a content item associated with a location that is within a threshold distance of the location of the client device regardless of whether the location is within the field of view of a sensor of the client device 310 (or regardless of whether the location is within the field of view displayed by the client device 310). In another example, the selection module 440 selects a content item associated with a location that is within a threshold distance of a route the player is traveling on (e.g., to achieve a game objective) even if the location is not currently within the field of view of a sensor of the client device 310.

The orientation of the client device 310 may be used to determine whether a location is currently within the field of view being displayed by the client device or within a field of view of a sensor of the client device 310. For example, if the client device 310 is in front of a store location and oriented toward the location, the selection module 440 selects a content item associated with the location (or the store). In some embodiments, object recognition is performed on an image to identify an object (e.g., store) at a location.

The selection module 440 may select multiple content items (e.g., a threshold number of content items) to be transmitted to and displayed by the client device 310. For example, the selection module 440 may select multiple content items if the client device 310 is displaying a view of an environment that includes multiple locations associated with content items (e.g., due to the camera assembly 312 of the client device capturing an image that includes the multiple locations).

In some embodiments, the selection module 440 may rank the content items in the set to determine which threshold number of content items to select to be displayed (e.g., if the client device 310 displays a number of locations associated with content items that exceeds the threshold number of content items to be displayed). The content items may be ranked according to one or more factors and the selection module 440 may then select the threshold number of content items based on the ranking (e.g., the topmost ranked content items are selected). Example factors include bid amount associated with the content items (a higher bid may increase the ranking) and distance between the location of the client device and the locations associated with the content items (a closer location may increase the ranking). In some embodiments, if the client device displays a number of locations associated with content items that exceeds the number of content items to be displayed, a real time bidding process is performed to determine which content items to select.

In addition to, or alternative to, the ranking factors discussed above, the selection module 440 may select a content item based on product availability, player interests, or product targeting criteria. Although these factors are discussed above with respect to the identification module 420, the selection module 440 may additionally, or alternatively, use these factors.

The third party system module 445 enables a player to conduct a transaction with a third party system (e.g., 340). For example, responsive to a player confirming a purchase of a product (e.g., by interacting with a content item), the third party system module 445 notifies the third party system associated with the product. The third party system module 445 may transmit the product details and player name to the third party system and may instruct the third party system to begin preparing the product for pickup by the player. The third party system may notify the third party system module 445 after the player picks up the product.

In some embodiments, to complete the product transaction between the player and the third party system, the third party system module 445 charges the player using a payment method (e.g., the player previously provided payment method instructions (e.g., credit card information)), and pays the third party system for the cost of the product. Additionally, or alternatively, the third party system module 445 may provide in-game rewards to the player as a reward for purchasing the product.

Among other advantages, the third party system module 445 enables a player to purchase a product through the location based game. This may allow the player to purchase and pick up a product while continuing to play the location-based game (e.g., without exiting or pausing the game).

If a third party system (e.g., 340) wants the location-based game to display content items that advertise products of the third party system, the third party system may provide details of its products (e.g., via a business portal). Example details include images of the products, prices of the products, locations of stores in the real world where the products can be picked up, business hours of those stores, and availability of the products (e.g., inventory) at those stores. In some embodiments, the third party system 340 also provides promotional information, such as information describing sales on certain products. The third party system 340 may provide bid information to be associated with content items that advertise the products. The above details may be stored in the third party system profile store 465.

In some embodiments, the third party system may specify targeting criteria for a product. Targeting criteria may specify one or more characteristics of players eligible to be presented with a content item advertising the product. For example, targeting criteria are used to identify players having player profile information, or actions satisfying at least one of the targeting criteria. To give a more specific example, targeting criteria may specify that a content item is preferably presented to players in a specific age range (e.g., ages 18-24). In another example, targeting criteria specify that a content item is preferably presented to players participating in social games/activities of the location-based game or to players with high social interests (e.g., players that like to participate in social activities/games of the location-based game). For example, an ice cream shop specifies that a content item is displayed in a waiting screen of a multi-person (e.g., 6 person) raid lobby, where the content item describes a discount that is only applicable if a threshold number of people in the raid lobby (e.g., 6 people) select to buy ice cream (e.g., in the next 5 minutes). Targeting criteria may also be stored in the third party system. The identification module 420 or selection module 440 may consider targeting criteria associated with products when selecting content items.

The commercial game module 323 or the third party system can generate content items based on the product information provided by the third party system and store the generated content items in the content store 460.

The content store 460 stores content items. As previously suggested, a content item may advertise a product that can be purchased or picked up at a location (in the real world). The content item may be associated with one or more locations (e.g., the location where the product can be purchased or picked up). For example, the location associated with a content item is the location of a store or business selling the product (the store may be part of a third party system (e.g., 340)). In some embodiments, a content items relates to an event at a location within a threshold distance of a player (e.g., a concert or construction), environment conditions at a location within a threshold distance of a player (e.g., street or weather conditions), or public announcements for a location (e.g., safety measures to take while moving through a location). Examples of content that a content item may include are text, image, audio, video, and a link. Content items in the content store 460 include content for presentation to a player. Content items may also include a bid amount. The content may include text, image, audio, video, a link or any other suitable data presented to a player. The bid amount may be is used to determine a value, such as monetary compensation, provided by a third party system (e.g., 340) to the commercial game module 323 if content in the content item is presented to a player, if the content in the content item receives a player interaction when presented, or if any suitable condition is satisfied when content in the content item is presented to a player. For example, the bid amount included in a content item specifies a monetary amount that the commercial game module 323 receives from a third party system who provided the content item (or content of the content item) to the commercial game module 323 if the content item is displayed (e.g., in an interface of the location-based game).

Figure 5A:
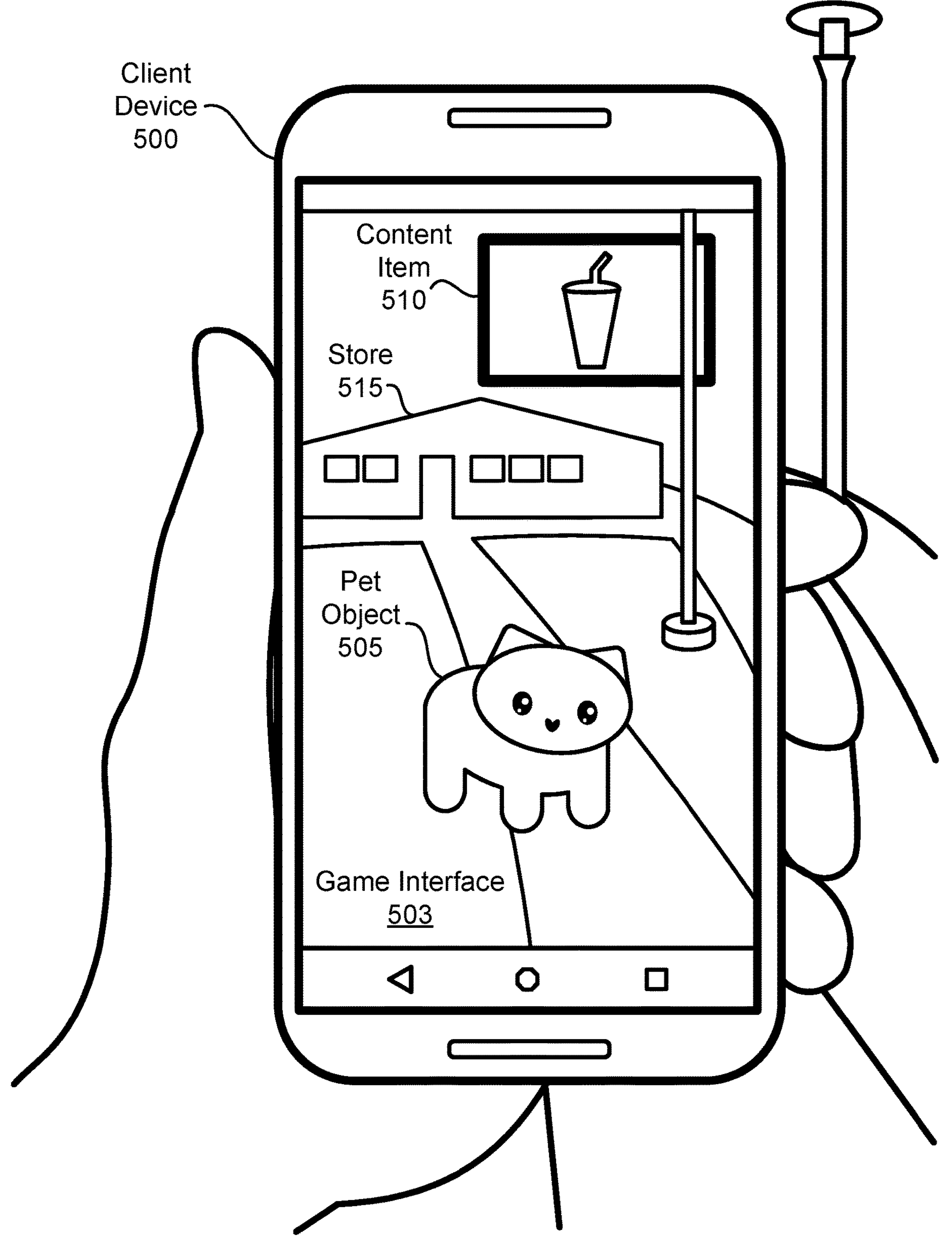
FIG. 5A is a diagram of a player holding a client device that is displaying a content item in a game interface, according to one embodiment.

FIG. 5A is a diagram of a player holding a client device 500. Client device 500 may be an embodiment of client device 110 or 310. The client device 500 is displaying a game interface 503 to the player. In the example of FIG. 5A, the game interface 503 includes an image of an environment in the real world. The image may be captured by a camera assembly (e.g., 312) of the client device 500. The environment includes a store 515 that sells products in the real world. The game interface 503 also includes several virtual objects that appear to be in the environment. Specifically, the virtual objects include a pet object 505 and a content item 510. Content item 510 appears above the store 515 and displays a product sold by the store 515. The pet object 505 is a virtual creature that appears to be standing in front of the player. The pet object 505 may be part of a location-based parallel reality game. The display of the pet object 505 may be based on the location and orientation of the client device 500. In some embodiments, the pet object 505 is not associated with the store 515 or the content item 510.

In the example of FIG. 5A, content item 510 is displaying an image of a drink for purchase at store 515. The content item 510 may display other information related to the store 515 or the drink. For example, the content item 510 may display the cost of the drink or the distance to the store 515 in the real world. In another example, the content item 510 may display in-game rewards the player will receive if the player purchases a product sold by the store 515 (e.g., the product in the content item 510). In some embodiments, the player may receive an in-game reward responsive to selecting the content item 510 (e.g., without making a purchase).

In some embodiments, if the player changes the orientation of the client device 500 relative to store 515, the content item 510 may move accordingly in the game interface. For example, the content item 510 may continue to appear over the store 515 as the player changes the orientation of the client device 500. The content item 510 may continue to be displayed as long as the store 515 appears in the game interface 503. Additionally, or alternatively, the content item 510 may appear for a threshold period of time (e.g., ten seconds). After the threshold period of time passes without the player interacting with the content item 510 (e.g., selecting the content item 510), the client device 500 may stop displaying the content item 510. After this occurs, the client device 500 may display another content item (e.g., associated with another store in the game interface 503). For example, if content items are ranked (e.g., according to bids), a next ranking content item may be displayed in the game interface 503.

Figure 5B:
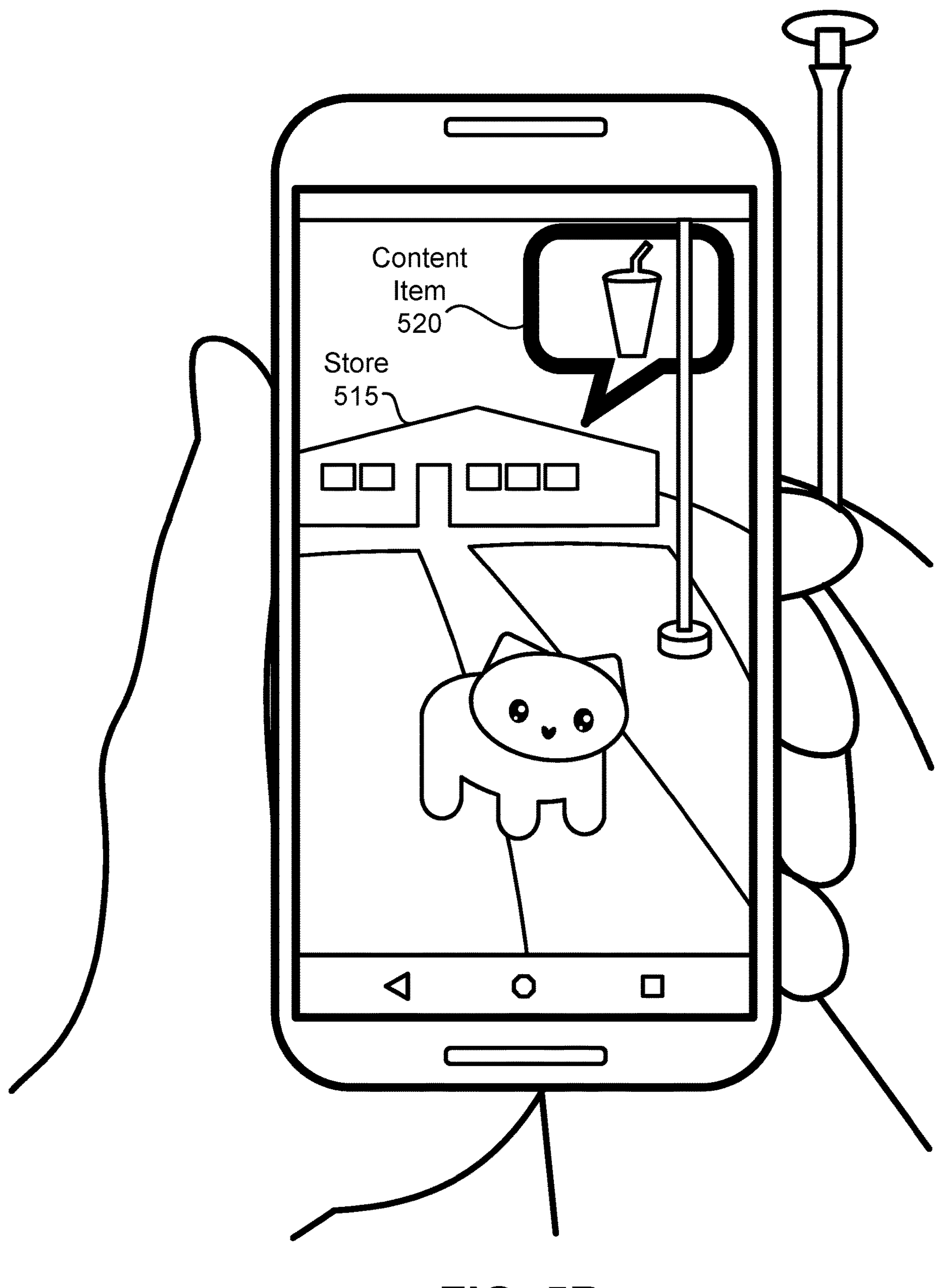
FIG. 5B is another diagram of a player holding a client device that is displaying a content item in a game interface, according to one embodiment.

As previously stated, the content item 510 appears to be above the store 515. More generally, a content item (e.g., 515) may be displayed in a manner that indicates the location of a store (e.g., 515) in an environment. Said differently, a content item may be displayed in a manner that indicates a product displayed in the content item can be purchased at the store. This may help the player determine where the store 515 is located. For example, the content item may appear to be at the location of the store in the environment (or within a threshold distance of the location). Said differently, the content item is displayed at a location on the screen of the client device such that the content item is overlaid on the view of the store location. In another example, the content item on the screen within a threshold distance of the store displayed on the screen of the client device (e.g., 500) (e.g., the content item is within a threshold number of pixels of the store). In another example, the content item appears to be in front of the store. In this case, the content item may be integrated into the front of the building of the store to look like a real-world advertisement. In another example, the size or shape of the content item in the interface (e.g., 503) indicates the location of the store. For example, if the player moves closer to the store in the real world, the size of the content item in the game interface may increase. Similarly, if the player moves away from the store, the size of the content item in the game interface may decrease. In some embodiments, a shape or outline of the content item may indicate the location of the store. An example of this is illustrated in FIG. 5B. FIG. 5B is a diagram of a player holding a client device similar to FIG. 5A, except the outline of the content item 520 points to the location of the store 515. In some embodiments, object recognition is performed to identify the store 515 in images captured by the client device 500. For example, object recognition is used to identify edges of the store 515 and the content item 510 is displayed relative to the identified edges.

As indicated above, in some embodiments, visual aspects of a content item may change over time. For example, the size of a content item in the interface may change. In another example, an image of the product in a content item may change (e.g., a new image of the product appears (e.g., taken from a different angle)). In another example, text of a content item may change (e.g., the font size or font color changes).

Referring back to FIG. 5A, the content item 510 may be displayed because the store 515 (e.g., the location of the store 515) is displayed in the game interface 503. In some embodiments, the content item 520 is displayed responsive to the store 515 being displayed in the game interface 503 for a threshold period of time (e.g., five seconds). Additionally, or alternatively, the content item 510 may be displayed responsive to determining the client device 500 is moving toward the store 515 or along a route toward the store 515 in the real world. The content item 510 may be selected among a set of different content items each associated with different stores. If multiple stores are displayed by the client device 500 (and the stores are associated with content items), a bidding process may determine which content items are displayed.

In the example of FIG. 5A, only one content item 510 is displayed. However, multiple content items may be displayed. The number of content items displayed may depend on the size of the client device screen, the size of the content items, the number of stores displayed in the game interface 503, bids associated with the content items, or the number of virtual objects already displayed in the game interface (e.g., virtual objects associated with the location-based game but not associated with a store or a content item in the environment). In some embodiments, the number of content items displayed may be set by a content item limit threshold. The number of content items to be displayed may be determined by the selection module 440.

To reduce or prevent the content item 510 from distracting the player from playing the location-based game, in some embodiments, the content item 510 does not obstruct virtual objects associated with the location-based game (but not associated with the store 515 or the content item 510) as the player plays the game. For example, if the pet object 505 climbs the light post, the content item 510 may move, cease being displayed, or the pet object 505 may appear in front of the content item 510. Additionally, or alternatively, the content item 510 may be displayed a threshold distance away from a virtual object on the screen (e.g., at least ten pixels) that is associated with the location-based game (e.g., but not associated with the store 515 or the content item 510).

Figure 5C:
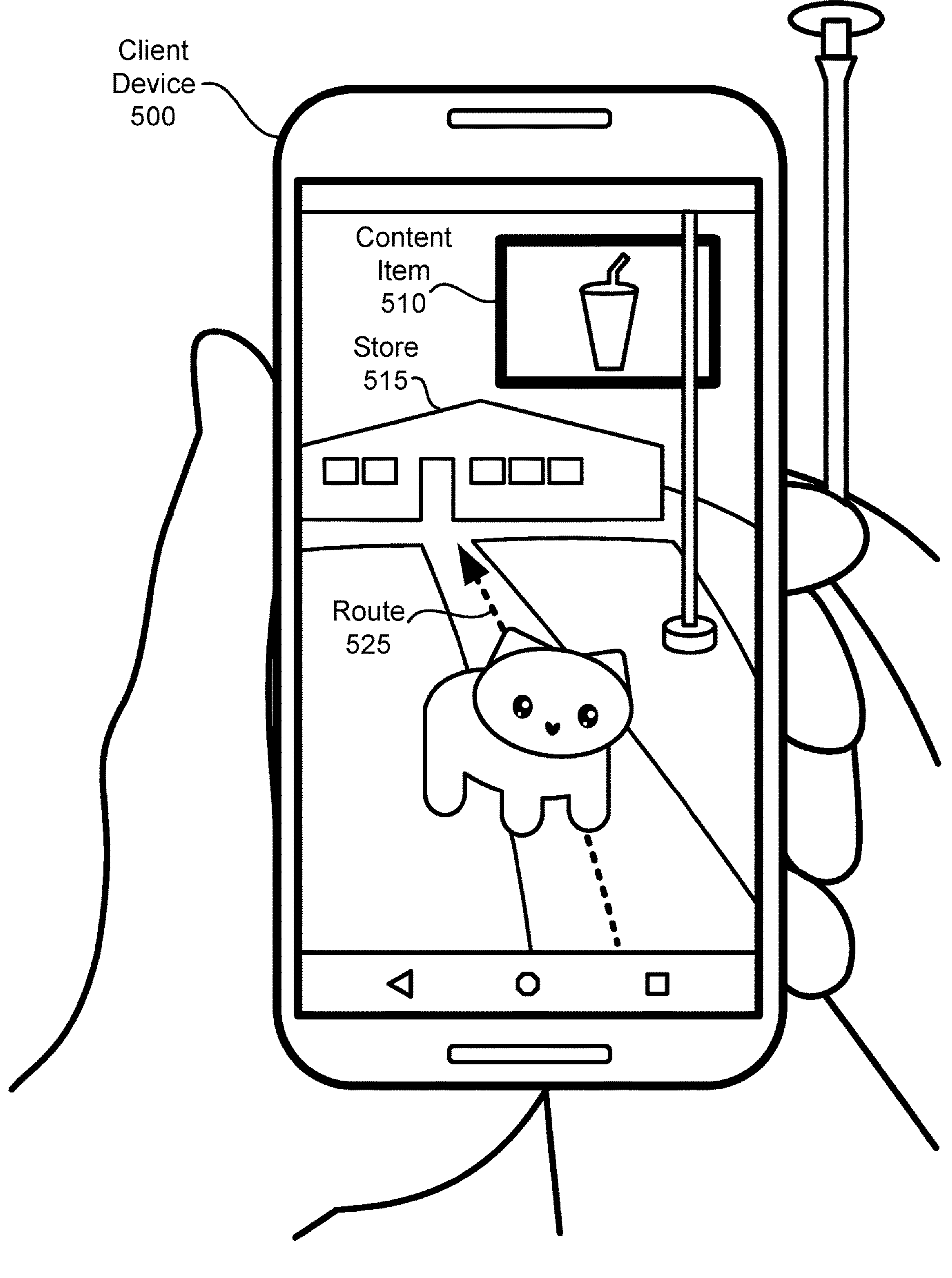
FIG. 5C is a diagram of a player holding a client device that is displaying a virtual route in a game interface, according to one embodiment.

In some embodiments, the game interface 503 displays a route to the store 515. For example, the game interface 503 displays a route to the store 515 responsive to the player interacting with the content item 510 (e.g., selecting the content item 510). In another example, the game interface 503 displays the route responsive to a player purchasing a product of the store 515 (e.g., through the location-based game). In another example, the game interface 503 displays the route responsive to the store 515 indicating (e.g., though the location-based game) that a product purchased by the player is ready for pick up at the location of the store 515. An example route 525 is illustrated in FIG. 5C. FIG. 5C is a diagram of a player holding a client device similar to similar to FIG. 5A, except the game interface includes a virtual route 525 to the location of the store 515.

Referring back to FIG. 5A, in some embodiments, a virtual object (e.g., pet object 505) associated with the location-based game (e.g., but not associated with the store 515 or the content item 510) performs an action that directs the player to the location of the store 515. For example, the pet virtual object 505 points to the store 515, speaks to the player, or walks towards the store 515. These actions may be performed by the pet virtual object 505 responsive to the player interacting with the content item 510 (e.g., purchasing a product of the store 515).

Among other advantages, content items (e.g., 510 and 520) help inform the player about products for purchase nearby (e.g., in front of the player). Unless the player is familiar with the environment, the player may not know which products can be purchased nearby. More than that, in some embodiments, content item 510 doesn't obscure virtual objects of the location-based game (e.g., pet object 505), thus allowing the player to learn about nearby stores while continuing to play the location-based game. Furthermore, the content items may display products that complement the location-based game. For example, if a player is moving on a route toward a game objective, content items may display products that can be picked up without significantly deviating from the route. Additionally, or alternatively, content items may display products that can be used or consumed while the player continues to move toward the game objective. For example, content items may display food that can be consumed with one hand (e.g., drinks) instead of displaying large bulky products (e.g., furniture).

Figure 5D:
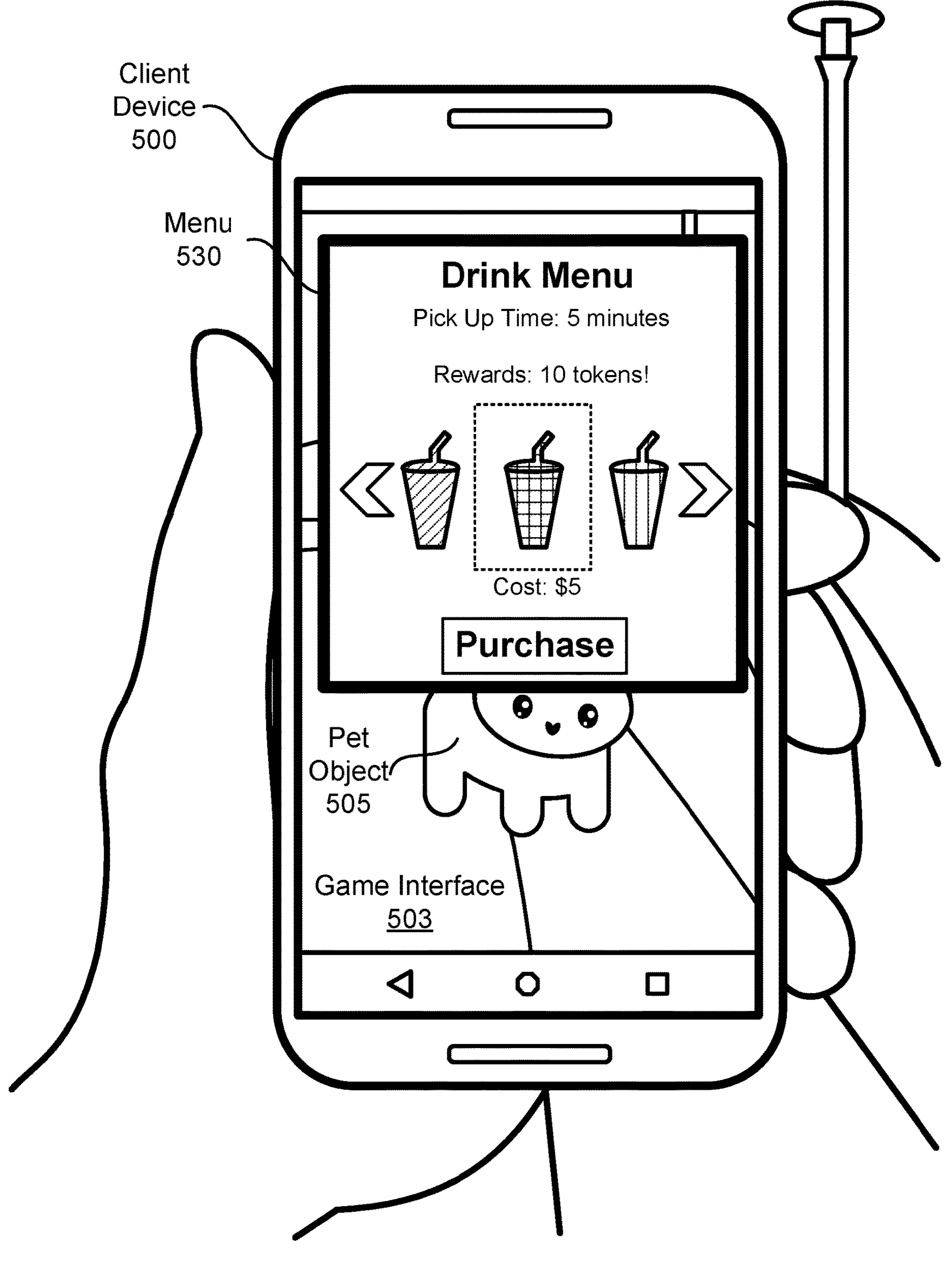
FIG. 5D is a diagram of a player holding a client device that is displaying a menu in a game interface, according to one embodiment.

FIG. 5D is another diagram of the player holding the client device 500. In the example of FIG. 5D, the game interface 503 includes a menu 530. The game interface 503 may display the menu 530 in response to the player selecting content item 510 or 520. The menu 530 allows the player to select and purchase drinks from store 515 through the location-based game. In the example of FIG. 5D, the menu 520 includes an estimated pick-up time duration, a rewards number, a drink selection, a cost, and a purchase button. The pick-up time duration lists an estimated amount of time the player would wait until the drink is ready for pick up at store 515 if the player purchased the selected drink. The rewards number lists the number of tokens the player would receive if the player purchased the selected drink (a token is an example of an in-game reward). The drink selection lists drinks available for purchase. The player can change the selected drink by selecting a chevron shape on the left or right side of the menu 530. The cost lists the cost of purchasing the selected drink. The purchase button allows the player to purchase the selected drink.

Among other advantages, menu 530 allows the player to purchase a drink from store 515 remotely through the location-based game. Thus, the player can purchase a drink without exiting or pausing the location-based game. Said differently, the menu 530 allows the player to purchase a drink while continuing to play the location-based game. This is illustrated in FIG. 5D by the presence of the pet object 505. For example, the player may be able to interact with pet object 505 while the game interface 503 includes menu 530. These advantages contrast with conventional methods in which a player needs to exit a game, conduct research on nearby businesses (e.g., to determine which products are available for purchase), and manually contact one or more of these businesses to purchase products. More than that, these conventional methods may not enable the nearby businesses to provide targeted advertisements to the player.

Example Methods

FIG. 6 is a flowchart of a process for displaying a virtual content item in a location-based game, according to one embodiment. The steps of FIG. 6 are illustrated from the perspective of a client device (e.g., 310) performing the method 600. However, some or all of the steps may be performed by other entities or components (e.g., the game server 320). In addition, some embodiments may perform the steps in parallel, perform the steps in different orders, or perform different steps.

The client device determines 610 a location of the client device. For example, a positioning module (e.g., module 316) or a localization module (e.g., module 318) of the client device may determine the location of the client device.

The client device receives 620 a set of content items that are in proximity to the location. For example, each content item is associated with a location that is within a threshold distance of the location of the client device. The set may be received from the game server (e.g., 320), for example, in response to receiving the location of the client device.

The client device receives 630, from a sensor of the client device, sensor data describing an environment at the location. As described with respect to FIG. 3, a client device can include a variety of sensors for collecting data related to an environment. For example, the client device includes a camera assembly (e.g., assembly 312) that captures image data that describes a scene of the environment surrounding the client device. Other example sensors include movement sensors, accelerometers, and gyroscopes. The sensor data describing the environment at the location can include data from any of these sensors.

The client device determines 640 an orientation of the client device using the sensor data. For example, the client device includes a localization module (e.g., 318) that determines the orientation of the client device.

The client device selects 650 a content item from the set of content items based on the orientation of the client device. The content item is associated with a location in the external environment. Selecting the content item may include the client device determining the location associated with the content item is in an image captured by a camera assembly (e.g., 312) of the client device. In some embodiments, selecting the content item from the set of content items includes determining the location associated with the content item is within a threshold distance of a route a player associated with the computing device is expected to travel along to achieve an objective of the location-based game. In some embodiments, the content item is selected responsive to determining the client device is moving toward the location associated with the content item. For example, determining the client device is moving toward the location includes determining the distance between the client device and the location is decreasing (e.g., by at least a minimum threshold velocity). In another example, determining the client device is moving toward the location includes determining the client device is moving along a route that will result in the client device moving toward the location.

The client device provides 660 for display, within the location-based game, the selected content item in conjunction with a view of the external environment. The content item and the view of the environment may be displayed by the client device. The view of the environment may be a view of the real world (e.g., the environment is viewed through a transparent display (e.g., the client device is a pair of AR glasses)). When the content item is displayed, it may appear to be at the location in the environment associated with the content item. In some embodiments, the content item is displayed in an interface. The position of the content item in the interface may indicate the location associated with the content item in the view of the environment.

In some embodiments, when the content item is displayed, the size of the content item indicates a distance between the location of the client device and the location in the environment associated with the content item. Additionally, or alternatively, the shape of the content item may indicate the location in the environment associated with the content item.

Responsive to receiving an indication that a player interacted with the content item, the client device may display a route from the location of the client device to the location in the environment associated with the content item. Additionally, or alternatively, responsive to receiving an indication that a player interacted with the content item, the client device transmits an instruction to initiate a transaction associated with the content item through the location-based game. In some embodiments, responsive to receiving an indication that a player interacted with the content item, the client device generates in-game rewards of the location-based game for a player of the computing device.

If the content item is displayed for a threshold amount of time without a player interacting with the content item, the client device may cease displaying the content item, select a second content item from the set of content items, and display, within the location-based game, the second content item in conjunction with a second view of the environment.

In some embodiments, the client device displays within the location-based game, a virtual object, wherein the display of the content item does not obscure the virtual object. For example, the content item is displayed a threshold distance away from the virtual object. In some embodiments, responsive to receiving an indication that a player interacted with the content item, the client device may display the virtual object performing an action that directs the player to the location associated with the content item.

In some embodiments, the received set of content items are identified by the client device or another computing device (e.g., game server 320) by performing operations that include: identifying locations associated with content items that are within a threshold distance of the location of the client device and adding content items associated with locations that are within the threshold distance to the set of content items.

Example Computing System

Figure 7:
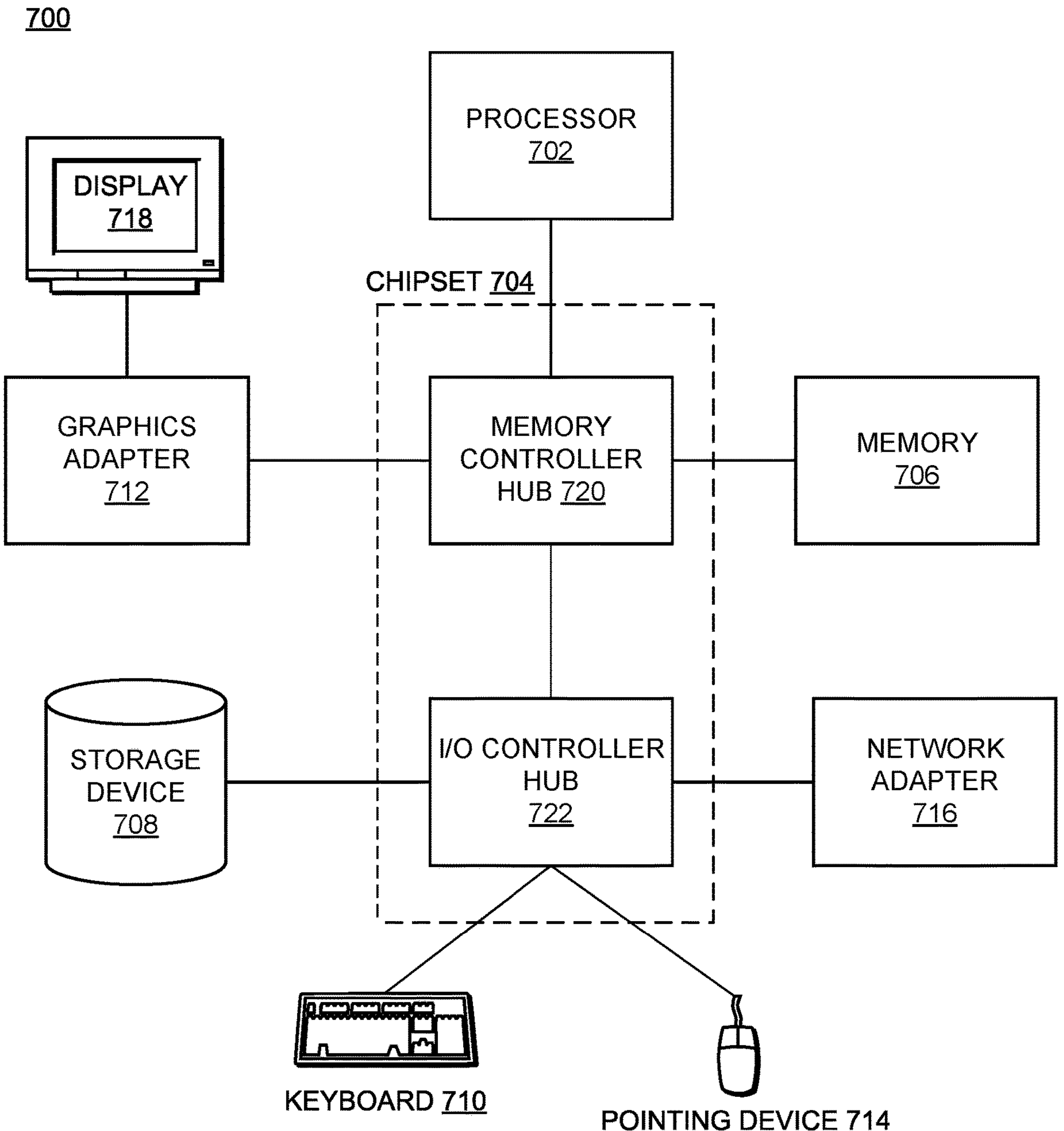
FIG. 7 illustrates an example computer system suitable for use in the networked computing environment of FIG. 1, according to one embodiment.

FIG. 7 is a block diagram of an example computer 700 suitable for use as a client device 310 or game server 320. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and may be used in combination with the keyboard 710 (which may be an on-screen keyboard) to input data into the computer system 700. The graphics adapter 712 displays images and other information on the display 718. The network adapter 716 couples the computer system 700 to one or more computer networks, such as network 370.

The types of computers used by the entities of FIGS. 3 and 4 can vary depending upon the embodiment and the processing power required by the entity. For example, the game server 320 might include multiple blade servers working together to provide the functionality described. Furthermore, the computers can lack some of the components described above, such as keyboards 710, graphics adapters 712, and displays 718.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A non-transitory computer-readable storage medium comprising stored instructions for providing a location-based game, the instructions, when executed by a computing device, causing the computing device to perform operations including:

determining a first location of the computing device;

receiving a set of content items associated with locations;

accessing a first route a player associated with the computing device is expected to travel along to arrive at a second location different than the first location of the computing device;

identifying a content item from the set is associated with a third location that is within a first threshold distance of the first location and that is different than the first location and the second location;

identifying the third location associated with the content item is within a second threshold distance of the first route the player is expected to travel along;

receiving, from a camera assembly of the computing device, an image describing an environment at the first location of the computing device;

determining the third location associated with the content item is in the image captured by the camera assembly of the computing device;

responsive to (a) the third location being within the first threshold distance of the first location, (b) the third location being within the second threshold distance of the first route, and (c) the third location being in the image captured by the camera assembly of the computing device, providing for display, within the location-based game, the content item associated with the third location in conjunction with a view of the third location in the environment from a perspective of the computing device; and responsive to receiving an indication that the player interacted with the content item while a current location of the computing device is not at the third location, providing for display a second route from the current location of the computing device to the third location in the environment associated with the content item, wherein the second route is different from the first route.

2. The non-transitory computer-readable storage medium of claim 1, wherein the content item is provided for display such that the content item appears to be at the third location associated with the content item in the view of the third location in the environment from the perspective of the computing device.

3. The non-transitory computer-readable storage medium of claim 1, wherein the content item is provided for display in an interface, a position of the content item in the interface indicating the third location associated with the content item in the view of the third location in the environment from the perspective of the computing device.

4. The non-transitory computer-readable storage medium of claim 1, wherein a size of the content item indicates a distance between the first location of the computing device and the third location in the environment associated with the content item.

5. The non-transitory computer-readable storage medium of claim 1, wherein at least a portion of the outline of the content item points to the third location in the environment associated with the content item.

6. The non-transitory computer-readable storage medium of claim 1, wherein the operations further include:

selecting the content item from the set of content items responsive to determining the computing device is moving toward the third location associated with the content item.

7. The non-transitory computer-readable storage medium of claim 1, wherein the operations further include:

responsive to receiving the indication that the player interacted with the content item, transmitting an instruction to initiate a transaction associated with the content item through the location-based game.

8. The non-transitory computer-readable storage medium of claim 1, wherein the operations further include:

responsive to receiving the indication that the player interacted with the content item, generating in-game rewards of the location-based game for the player of the computing device.

9. The non-transitory computer-readable storage medium of claim 1, wherein the operations further include:

responsive to the content item being displayed for a threshold amount of time without the player interacting with the content item, selecting a second content item from the set of content items; and providing for display, within the location-based game, the selected second content item in conjunction with a second view of the environment from the perspective of the computing device.

10. The non-transitory computer-readable storage medium of claim 1, wherein the operations further include:

providing for display, within the location-based game, a virtual object, wherein the display of the content item does not obscure the virtual object.

11. The non-transitory computer-readable storage medium of claim 10, wherein the content item is displayed a third threshold distance away from the virtual object.

12. The non-transitory computer-readable storage medium of claim 10, wherein the operations further include:

responsive to receiving the indication that the player interacted with the content item, the virtual object performs an action that directs the player to the third location associated with the content item.

13. The non-transitory computer-readable storage medium of claim 1, wherein the received set of content items are identified by the computing device or another computing device performing operations including:

identifying locations associated with content items that are within the first threshold distance of the first location of the computing device; and adding content items associated with locations that are within the first threshold distance to the set of content items.

14. The non-transitory computer-readable storage medium of claim 1, wherein the content item relates to a physical object in the environment.

15. The non-transitory computer-readable storage medium of claim 1, wherein the first route does not pass through locations associated with content items of the set of content items.

16. A method comprising:

determining a first location of a client device;

receiving a set of content items associated with locations;

accessing a first route a player associated with the client device is expected to travel along to arrive at a second location different than the first location of the client device;

identifying a content item from the set is associated with a third location that is within a first threshold distance of the first location and that is different than the first location and the second location;

identifying the third location associated with the content item is within a second threshold distance of the first route the player is expected to travel along;

receiving, from a camera assembly of the client device, an image describing an environment at the first location of the client device;

determining the third location associated with the content item is in the image captured by the camera assembly of the client device;

responsive to (a) the third location being within the first threshold distance of the first location, (b) the third location being within the second threshold distance of the first route, and (c) the third location being in the image captured by the camera assembly of the client device, providing for display, within a location-based game, the content item associated with the third location in conjunction with a view of the third location in the environment from a perspective of the client device, and responsive to receiving an indication that the player interacted with the content item while a current location of the client device is not at the third location, providing for display at a second route from the current location of the client device to the third location in the environment associated with the content item, wherein the second route is different from the first route.

17. The method of claim 16, wherein the content item appears to be at the third location in the environment associated with the content item.

18. The method of claim 16, wherein the content item is sent for display in an interface, a position of the content item in the interface indicating the third location associated with the content item in the view of the environment.

* * * * *